(12) United States Patent
Sloan

(10) Patent No.: US 6,706,994 B1
(45) Date of Patent: Mar. 16, 2004

(54) WELDING TORCH ASSEMBLY INCLUDING QUICK CONNECT FITTINGS

(76) Inventor: John Sloan, 2053-43rd St., Apt. Q9, Grand Rapids, MI (US) 49507

( * ) Notice: Subject to any disclaimer, the term of this patent is extended or adjusted under 35 U.S.C. 154(b) by 0 days.

(21) Appl. No.: 10/283,687

(22) Filed: Oct. 30, 2002

(51) Int. Cl.[7] .............................................. B23K 10/00
(52) U.S. Cl. ...................... 219/121.51; 219/74; 219/75; 219/121.48; 219/121.55; 219/137.63
(58) Field of Search ....................... 219/121.48, 121.45, 219/121.39, 121.58, 121.59, 121.36, 137.62, 137.63, 137.61, 74, 75, 121.55, 121.51

(56) References Cited

U.S. PATENT DOCUMENTS

| | | |
|---|---|---|
| 4,210,796 A | * 7/1980 | Moerke ................. 219/137.63 |
| 4,529,861 A | 7/1985 | Blanton |
| 4,939,339 A | 7/1990 | Folkening et al. |
| 5,074,802 A | 12/1991 | Gratziani et al. |
| 5,258,599 A | 11/1993 | Moerke |
| 5,624,586 A | * 4/1997 | Sobr et al. ............. 219/137.63 |

* cited by examiner

Primary Examiner—Mark Paschall
(74) Attorney, Agent, or Firm—Price, Heneveld, Cooper, DeWitt & Litton, LLP

(57) ABSTRACT

A welding torch assembly includes a torch body, a plurality of quick connect fittings and an elongated electrically insulated handle. The torch body includes a plurality of utility supply lines extending from the torch body with one of the quick connect fittings coupled at an end of each of the utility supply lines. The handle is shaped to engage at least a portion of the torch body and extend over at least one of the fittings.

21 Claims, 3 Drawing Sheets

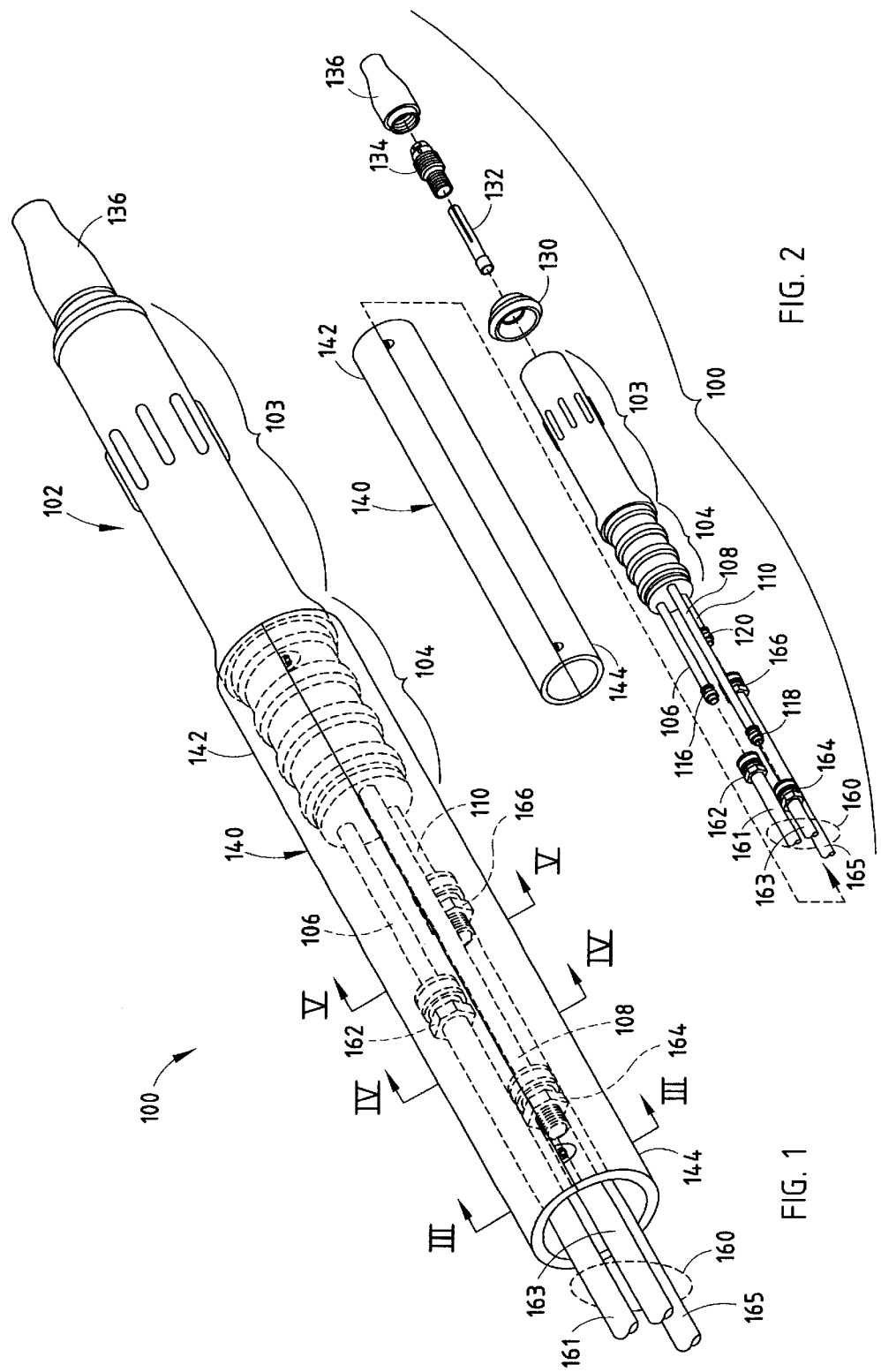

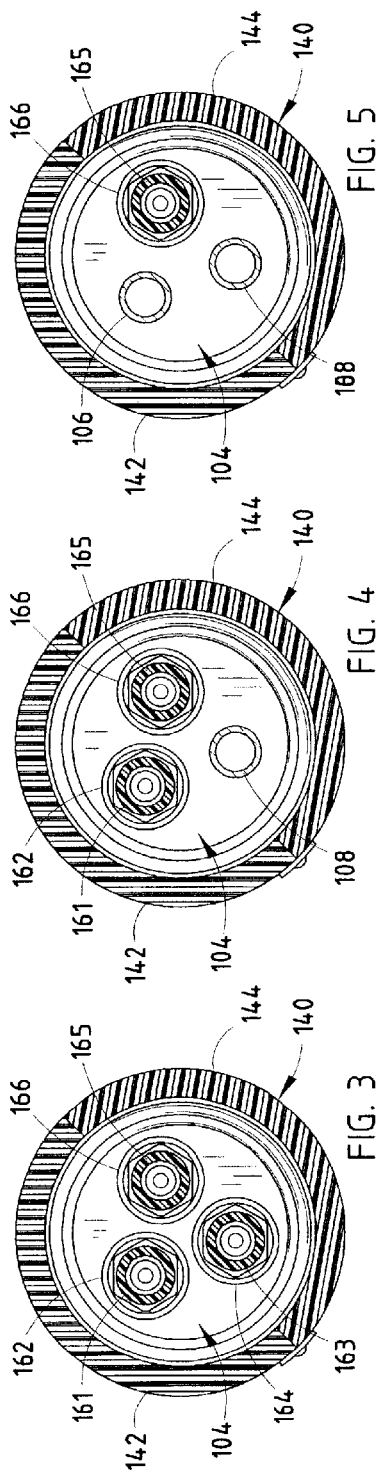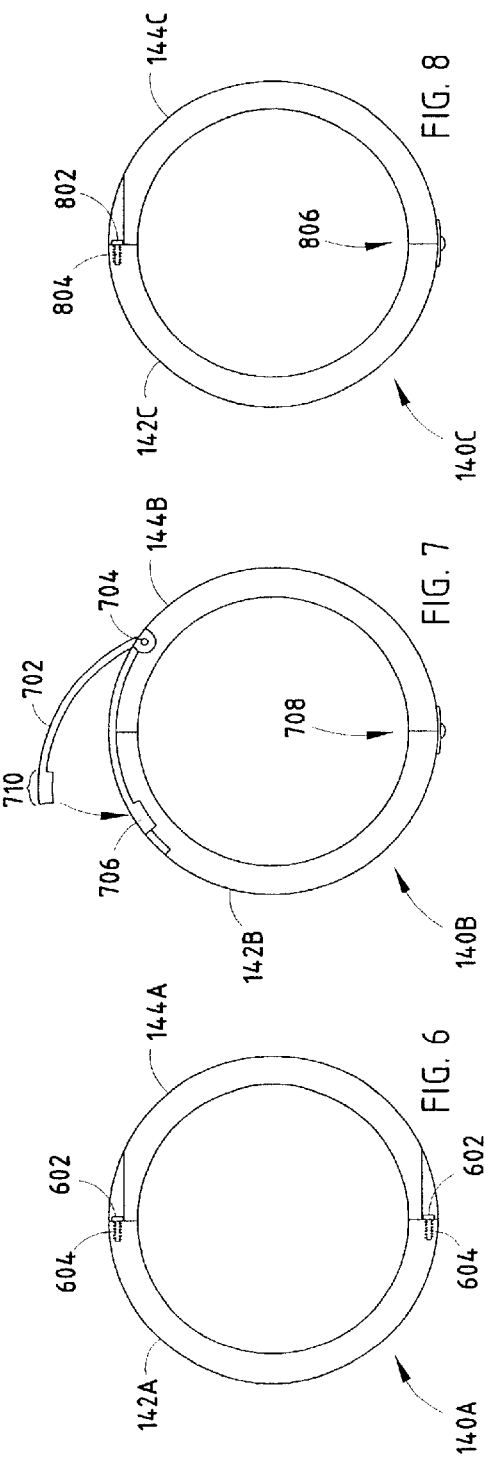

WELDING TORCH ASSEMBLY INCLUDING QUICK CONNECT FITTINGS

BACKGROUND OF THE INVENTION

The present invention is generally directed to a welding torch assembly and, more specifically, to a welding torch assembly that includes quick connect fittings and/or a two-piece electrically insulated handle.

Various welding torches have been proposed that utilize quick connect fittings on ends of utility source lines, at utilities, to couple a welding torch assembly and its associated utility supply lines to the utilities, which have included shield gas supplies, plasma gas supplies, coolant (e.g., water) supplies and electrical supplies. However, commercially available welding torch assemblies have typically implemented screw-on couplings to connect utility supply lines, extending from a torch body, to ends of utility source lines. In various welding torch systems, such as plasma arc welding (PAW), tungsten inert gas (TIG) and metal inert gas (MIG) systems, a welding torch assembly has generally included a torch body, which has typically been constructed to receive a handle that electrically isolates an equipment operator from an electrical supply that provides electrical power to the torch assembly, for welding.

In various welding torch assemblies, when a welding torch assembly is initially installed and/or replaced, it is necessary to slide an electrically insulated handle onto the utility source lines, provided between the utilities and the torch assembly, to provide access to couplings of the utility supply lines. Traditionally, these couplings have been screw-on couplings, which have required tightening to secure the torch assembly to ends of the utility source lines. Unfortunately, imparting a twisting motion to the handle, which is generally required to mount a portion of the handle onto a ribbed portion of the torch body, has frequently resulted in loosening of one or more of the screw-on couplings. Loosening of the screw-on couplings, upon mounting the handle onto the torch body, may also interrupt electrical power and/or result in leakage of coolant or gases, which may create a potential safety hazard, such as slips caused by fluid spills on a floor and/or electrical shock of the equipment operator utilizing the torch assembly, due to the leaking fluid providing a conductive path between the electrical supply and the equipment operator.

What is needed is a welding torch assembly with utility supply lines configured to mate with fittings that prevent spillage and/or escape of gases/cooling fluids supplied through utility source lines. Further, it would be desirable for the welding torch assembly to include an electrically isolated handle that can be readily placed over the utility supply lines and onto a portion of a torch body of the welding torch assembly, without twisting of the handle onto the torch body.

SUMMARY OF THE INVENTION

An embodiment of the present invention is directed to a welding torch assembly that includes a torch body, a plurality of quick connect fittings and an elongated electrically insulated handle. The torch body includes a plurality of utility supply lines extending from the torch body with one of the quick connect fittings coupled at an end of each of the utility supply lines. The handle is shaped to engage at least a portion of the torch body and extend over at least one of the fittings.

According to another embodiment of the present invention, a welding torch assembly includes a torch body, a plurality of quick connect fittings and an elongated two-piece electrically insulated handle. The torch body includes a plurality of utility supply lines extending from the torch body with one of the quick connect fittings coupled at an end of each of the utility supply lines. The handle is shaped to engage at least a portion of the torch body and extend over at least one of the fittings. The handle includes a first piece and a second piece that are joined by a hinge.

According to yet another embodiment of the present invention, a welding torch assembly includes a torch body, a plurality of fittings and an elongated two-piece electrically insulated handle. The torch body includes a plurality of utility supply lines extending from the torch body, with one of the fittings coupled at an end of each of the utility supply lines. The handle is shaped to engage at least a portion of the torch body and extend over at least one of the fittings.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is an assembly view of an exemplary welding torch assembly, according to one embodiment of the present invention;

FIG. 2 is an exploded view of the welding torch assembly of FIG. 1;

FIG. 3 is a cross-sectional view of the welding torch assembly of FIG. 1, along the lines III—III;

FIG. 4 is a cross-sectional view of the welding torch assembly of FIG. 1, along the lines IV—IV;

FIG. 5 is a cross-sectional view of the welding torch assembly of FIG. 1, along the lines V—V;

FIG. 6 is an end view of a two-piece housing, whose first and second sides are joined with fasteners;

FIG. 7 is an end view of a two-piece housing, whose first sides are joined by a hinge and whose second sides are joined by a clasp;

FIG. 8 is an end view of a two-piece housing, whose first sides are joined by a hinge and whose second sides are joined by fasteners;

DETAILED DESCRIPTION OF PREFERRED EMBODIMENTS

Figure 11:
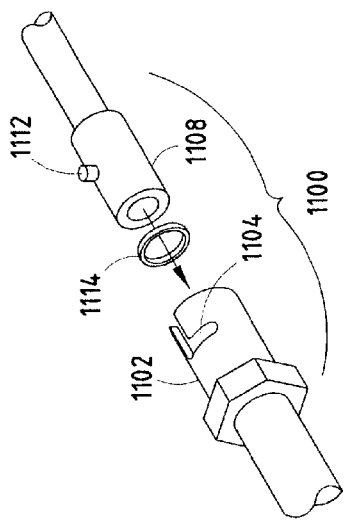
FIG. 11 is a perspective view of another exemplary quick connect fitting pair that requires a twisting motion to secure male and female fittings of the fitting pair and includes a post extending from an outer surface of the male fitting and a female fitting with a slot, extending through the female fitting, for receiving the post.

The present invention is directed to an improved welding torch assembly, which in one embodiment includes a plurality of quick connect fittings, e.g., male fittings, coupled at an end of each of a plurality of utility supply lines, which extend from a torch body. These utility supply lines may carry electrical current, an inert gas, a plasma gas and/or a cooling fluid, e.g., water, among other items. In another embodiment, an elongated electrically insulated two-piece handle is utilized to isolate an equipment operator from an electrical power source provided on a utility supply line. The two-piece housing may take various configurations, for example, fasteners may connect both first and second sides of the two-piece housing, a hinge (e.g., an electrically insulated hinge) may connect first sides of the two-piece housing and fasteners may be utilized to connect second sides of the two-piece housing. Alternatively, the two-piece housing may be connected at first sides by a hinge and at second sides by a clasp that extends from one of the pieces and latches into a groove formed in the opposite piece.

The welding torch assemblies, as described herein, provide a superior product design, in that the two-piece plastic housing does not loosen the fittings (couplings) on the utility supply lines, during installation of the handle onto a portion of the torch body and over at least one of the quick connect fittings. Further, providing appropriately constructed female quick connect fittings (e.g., couplings with shut-off valves) on ends of the utility source lines, which mate with male quick connect fittings installed on an end of each of the utility supply lines extending from the torch body, prevents leakage of gases and/or fluids from the utility sources, when the welding torch assembly is disconnected from the utility sources (at the welding torch assembly). Additionally, implementing quick connect fittings on the ends of the utility supply lines provides for easier connection and disconnection of the welding torch assembly should the need arise to replace the welding torch assembly. Further, quick connect fittings implemented as push-to-connect and/or manual connect type fittings (e.g., pneumatic quick couplings manufactured and made commercially available by Parker of Minneapolis, Minn.), as opposed to twist type fittings, are not prone, in general, to loosen when a traditional elongated electrical insulated handle is slid over the connectors and onto a portion of the torch body.

When an elongated electrically insulated two-piece handle is utilized with conventional screw-type connectors or twist-on quick connect fittings for the utility supply lines, installation of the two-piece handle onto the torch body and over one or more of the fittings does not loosen the fittings, as the handle is either hinged to allow opening of the two pieces and/or is screwed together at both sides, such that the fittings are not torqued. Further, implementing both quick connect fittings and a two-piece handle greatly reduces the amount of time required to couple or uncouple a welding torch assembly from utility source lines.

FIG. 1 depicts an assembly view of an exemplary tungsten inert gas (TIG) welding torch assembly 100, which is coupled to utilities through utility source lines 160. The welding torch assembly 100 includes a torch body 102 that includes a ribbed portion 104 and a main portion 103. A plurality of utility supply lines 106, 108 and 110 extend from and are integrated with the torch body 102. As is shown in FIGS. 1 and 2, a male quick connect fitting 116 is coupled at an end of the utility supply line 106, a male quick connect fitting 118 is coupled at an end of the utility supply line 108 and a male quick connect fitting 120 is coupled at an end of the utility supply line 110. The fittings 116, 118 and 120 are coupled to utilities via female quick connect fittings (e.g., single shut-off couplings) 162, 164 and 166, respectively, which are coupled to utility source lines 161, 163 and 165, respectively. For ease of installation, the utility supply lines 106, 108 and 110 may be of different lengths to stagger the fittings 116, 118 and 120. It should be appreciated that the quick connect fittings may take various forms, e.g., twist-on, push-to-connect and manual connect, and may also be constructed to prevent fluid and/or gas leakage when mateable fittings of the quick connect fittings are disconnected.

It should be appreciated that more or less than three utility supply lines may be implemented, according to the present invention. Further, it should be appreciated that the present invention is generally applicable to welding torch assemblies for any number of different applications, such as plasma arc welding (PAW), tungsten inert gas (TIG) and metal inert gas (MIG) welding. It should also be appreciated that a male fitting may be located at the end of a utility source line and a female connector may be coupled to a utility supply line, that extends from the torch body. A single fitting of a fitting pair may include a shut-off valve or, alternatively, both of the fittings may include shut-off valves. When a welding torch assembly is a TIG welding torch assembly, the utility supply line 106 may supply water, the utility supply line 108 may supply an inert gas and the utility supply line 110 may supply electrical power.

As is shown in FIG. 2, an elongated electrically insulated handle 140, e.g., a plastic handle, may include a first piece 142 and a second piece 144. As is also shown in FIG. 2, a gasket 130 may be positioned between an alumina nozzle 136, which receives and retains a collet body 134, which receives a collet 132 that retains a Tungsten rod (not shown).

FIGS. 3, 4 and 5 show cross-sectional views corresponding to the cross-sectional lines III—III, IV—IV and V—V, as is shown in FIG. 1. As is shown in FIGS. 3, 4 and 5, the female quick connect fittings 161, 163 and 165 are installed on ends of the utility source lines 162, 164 and 166, respectively, and the male quick connect fittings 116, 118 and 120 are installed on ends of the utility supply lines 106, 108 and 110, respectively.

FIG. 6 shows a cross-sectional view of an elongated electrically insulated handle 140A, according to one embodiment of the present invention. As is depicted in FIG. 6, a first piece 142A and a second piece 144A of the handle 140A are joined with fasteners 602, which are received in threaded apertures 604, formed in the first piece 142A.

FIG. 7 illustrates an elongated electrically insulated handle 140B, according to another embodiment of the present invention. As is shown in FIG. 7, first sides of first piece 142B and second piece 142B are joined by a hinge 708. Second sides of the pieces 142B and 144B are joined by a clasp 702 that is pinned 704 to the second piece 144B. A groove 706 formed in the first piece 142B receives a mounting portion 710 of the clasp 702. Similarly, an elongated electrically insulated two-piece handle 140C, see FIG. 8, includes a first piece 142C and a second piece 144C that are joined by a hinge 806 at first sides. Second sides of the pieces 142C and 144C are joined by a plurality of fasteners 802 that are received in threaded apertures 804, formed in the first piece 142C.

Figure 9:
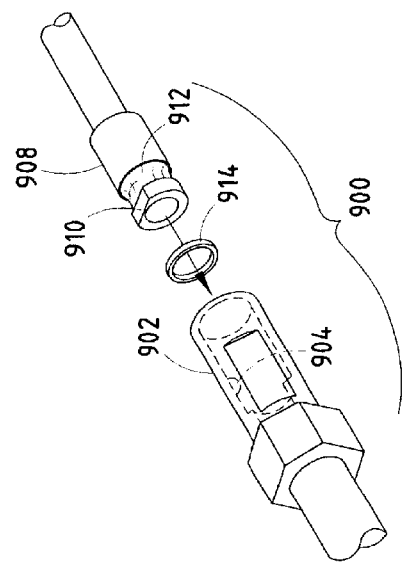
FIG. 9 is a perspective view of an exemplary quick connect fitting pair that requires a twisting motion to secure male and female fittings of the fitting pair.
Figure 10:
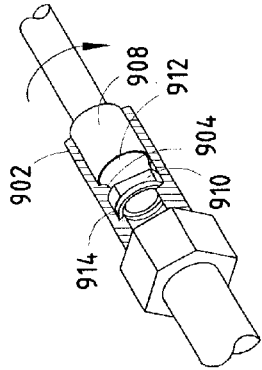
FIG. 10 is a partial cross-sectional view of the fitting pair of FIG. 9 with the male and female fittings of the fitting pair secured.

FIGS. 9 and 10 depict an exemplary quick connect fitting pair 900 that requires a twisting motion to secure male and female fittings 908 and 902, respectively, of the fitting pair 900. A seal 914 may be utilized to prevent leakage of a fluid or gas from the fitting pair 900, when the male fitting 908 is interlocked with the female fitting 902. A post 904 extends from an inner surface of the female fitting 902 and is shaped to lock into a groove 912, formed in an outer surface of the male fitting 908. A flat portion 910 of the male fitting 908 is constructed to allow positioning of the post 904 into the groove 912, with the portions 902 and 908 being interlocked when twisted with respect to each other.

FIG. 11 depicts another exemplary quick connect fitting pair 1100 that requires a twisting motion to secure male and female fittings 1108 and 1102, respectively, of the fitting pair 1100 and includes a post 1112 extending from an outer surface of the male fitting 1108 and a female fitting 1102 with a slot 1104, extending through the female fitting 1102, for receiving the post 1112. A seal 1114 may be utilized to prevent leakage of a fluid or gas from the fitting pair 1100, when the male fitting 1108 is interlocked with the female fitting 1102.

Figure 12:
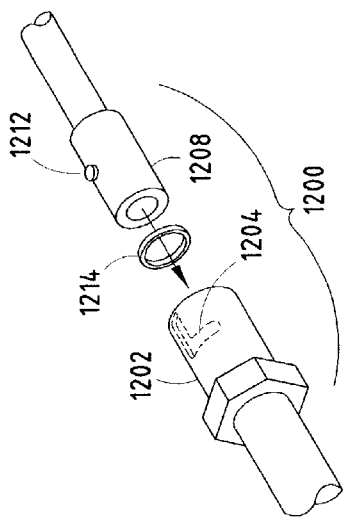
FIG. 12 is a perspective view of yet another exemplary quick connect fitting pair that requires a twisting motion to secure male and female fittings of the fitting pair and includes a post extending from an outer surface of the male fitting and a female fitting with a slot, extending into an inner surface of the female fitting, for receiving the post.

FIG. 12 depicts another exemplary quick connect fitting pair 1200 that requires a twisting motion to secure male and female fittings 1208 and 1202, respectively, of the fitting pair 1200 and includes a post 1212 extending from an outer surface of the male fitting 1208 and a female fitting 1202 with an internal slot 1204, formed into an inner surface of the female fitting 1202, for receiving the post 1212. A seal 1214 may be utilized to prevent leakage of a fluid or gas from the fitting pair 1200, when the male fitting 1208 is interlocked with the female fitting 1202. It should also be appreciated that each of the fitting pairs 900, 1100 and 1200 may be constructed as single and/or double shut-off couplings.

Accordingly, a number of welding torch assemblies have been described herein, which advantageously include quick connect fittings installed on ends of utility supply lines extending from a torch body of a welding torch assembly. This allows for quick coupling and decoupling when a welding torch assembly is initially installed and/or replaced. According to another embodiment of the present invention, an elongated electrically insulated two-piece handle is utilized, which further decreases the amount of time that is required to change out welding torch assemblies from an end of a utility source line that extends from a plurality of utilities.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A welding torch assembly, comprising:
   a torch body including a plurality of utility supply lines extending from the torch body;
   a plurality of quick connect fittings, wherein one of the fittings is coupled at an end of each of the utility supply lines, and wherein each of the fittings operates independently of the other fittings; and
   an elongated electrically insulated handle shaped to engage at least a portion of the torch body and extending over the fittings.

2. The assembly of claim 1, wherein the utility supply lines are of different lengths to stagger the fittings.

3. The assembly of claim 1, wherein the handle is a two-piece handle.

4. The assembly of claim 3, wherein a first piece and a second piece of the handle are joined by a hinge along a first side of the first and second pieces and secured by at least one fastener at a second side of the first and second pieces.

5. The assembly of claim 3, wherein a first piece and a second piece of the handle are joined by an electrically insulated hinge along a first side of the first and second pieces and secured by at least one fastener at a second side of the first and second pieces.

6. The assembly of claim 3, wherein a first piece and a second piece of the handle are joined by an electrically insulated hinge along a first side of the first and second pieces and secured by at least one clasp attached at a second side of the first piece, and wherein the second piece includes a groove for receiving a mating portion of the at least one clasp.

7. A welding torch assembly, comprising:
   a torch body including a plurality of utility supply lines extending from the torch body;
   a plurality of quick connect fittings, wherein one of the fittings is coupled at an end of each of the utility supply lines, and wherein each of the fittings operates independently of the other fittings; and
   an elongated two-piece electrically insulated handle shaped to engage at least a portion of the torch body and extending over at least one of the quick connect fittings, wherein a first piece and a second piece of the handle are joined by a hinge.

8. The assembly of claim 7, wherein the utility supply lines are of different lengths to stagger the fittings.

9. The assembly of claim 7, wherein the handle is a plastic handle.

10. The assembly of claim 9, wherein the first and second pieces of the handle are joined by a plastic hinge along a first side of the first and second pieces and secured by at least one fastener at a second side of the first and second pieces.

11. The assembly of claim 9, wherein the first and second pieces of the handle are joined by an electrically insulated hinge along a first side of the first and second pieces and secured by at least one fastener at a second side of the first and second pieces.

12. The assembly of claim 9, wherein the first and second pieces of the handle are joined by an electrically insulated hinge along a first side of the first and second pieces and secured by at least one clasp attached at a second side of the first piece, and wherein the second piece includes a groove for receiving a mating portion of the at least one clasp.

13. The assembly of claim 7, wherein the quick connect fittings are male fittings.

14. A welding torch assembly, comprising:
   a torch body including a plurality of utility supply lines extending from the torch body;
   a plurality of fittings, wherein one of the fittings is coupled at an end of each of the utility supply lines, and wherein each of the fittings operates independently of the other fittings; and
   an elongated two-piece electrically insulated handle shaped to engage at least a portion of the torch body and extending over at least one of the fittings.

15. The assembly of claim 14, wherein a first piece and a second piece of the handle are joined by a hinge along a first side of the first and second pieces and secured by a clasp attached at a second side of the first and second pieces.

16. The assembly of claim 14, wherein a first piece and a second piece of the handle are joined by an electrically insulated hinge along a first side of the first and second pieces and secured by an electrically insulated clasp attached at a second side of the first and second pieces.

17. The assembly of claim 14, wherein a first piece and a second piece of the handle are joined by electrically insulated fasteners along first and second sides of the first and second pieces.

18. The assembly of claim 14, wherein the utility supply lines are of different lengths to stagger the fittings.

19. The assembly of claim 14, wherein the first and second pieces of the handle are joined by a plastic hinge along a first side of the first and second pieces and secured by at least one plastic fastener at a second side of the first and second pieces.

20. The assembly of claim 14, wherein a first piece and a second piece of the handle are joined by an electrically insulated hinge along a first side of the first and second pieces and secured by at least one clasp attached at a second side of the first piece, and wherein the second piece includes a groove for receiving a mating portion of the at least one clasp.

21. The assembly of claim 14, wherein the fittings are quick connect fittings.

\* \* \* \* \*